(12) United States Patent
Li et al.

(10) Patent No.: US 10,624,154 B2
(45) Date of Patent: Apr. 14, 2020

(54) DATA TRANSMISSION METHOD, ACCESS POINT AND STATION

(71) Applicant: ZTE CORPORATION, Shenzhen (CN)

(72) Inventors: Nan Li, Shenzhen (CN); Kaiying Lv, Shenzhen (CN); Weimin Xing, Shenzhen (CN); Zhiqiang Han, Shenzhen (CN); Bo Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/754,459

(22) PCT Filed: Aug. 29, 2016

(86) PCT No.: PCT/CN2016/097233
§ 371 (c)(1),
(2) Date: Feb. 22, 2018

(87) PCT Pub. No.: WO2017/036375
PCT Pub. Date: Mar. 9, 2017

(65) Prior Publication Data
US 2018/0359806 A1    Dec. 13, 2018

(30) Foreign Application Priority Data

Aug. 31, 2015  (CN) .......................... 2015 1 0545945
Oct. 12, 2015  (CN) .......................... 2015 1 0658707

(51) Int. Cl.
*H04W 4/00*    (2018.01)
*H04W 80/02*   (2009.01)
(Continued)

(52) U.S. Cl.
CPC ............... *H04W 80/02* (2013.01); *H04L 1/16* (2013.01); *H04L 5/0055* (2013.01); *H04W 4/06* (2013.01); *H04W 72/0413* (2013.01); *H04W 72/0446* (2013.01); *H04W 74/002* (2013.01); *H04L 1/1671* (2013.01); *H04L 2001/0093* (2013.01); *H04W 72/1289* (2013.01); *H04W 84/12* (2013.01)

(58) Field of Classification Search
CPC .................................................... H04W 80/02
See application file for complete search history.

(56) References Cited

U.S. PATENT DOCUMENTS

2012/0327870 A1*  12/2012  Grandhi ............... H04W 28/06
                                                370/329
2013/0235792 A1*   9/2013  Abraham .............. H04W 88/04
                                                370/315
(Continued)

FOREIGN PATENT DOCUMENTS

| CN | 103533653 A  | 1/2014  |
| CN | 104253673 A  | 12/2014 |
| EP | 2538599 A1   | 12/2012 |

OTHER PUBLICATIONS

European Search Report for EP 16840804, dated Jul. 23, 2018; 11 pages.
(Continued)

*Primary Examiner* — Gerald A Smarth
(74) *Attorney, Agent, or Firm* — Cantor Colburn LLP (57) ABSTRACT

Disclosed are a data transmission method, an access point and a station. The method comprises: sending a radio frame to a plurality of stations, triggering the stations to perform unlink multi-user transmission, and when the stations belong to different basic service sets of the access point, setting a sending address of the radio frame to be a common address.

17 Claims, 5 Drawing Sheets

--- receive a radio frame sent by an access point, the radio frame for triggering the station to perform uplink multi-user transmission — 401 perform uplink multi-user transmission — 402

(51) Int. Cl.
    *H04W 74/00*     (2009.01)
    *H04L 1/16*     (2006.01)
    *H04L 5/00*     (2006.01)
    *H04W 4/06*     (2009.01)
    *H04W 72/04*     (2009.01)
    *H04W 84/12*     (2009.01)
    *H04W 72/12*     (2009.01)
    *H04L 1/00*     (2006.01)

(56) References Cited

U.S. PATENT DOCUMENTS

| | | | |
|---|---|---|---|
| 2014/0064257 A1* | 3/2014 | Fontaine | H04W 72/0446 370/336 |
| 2015/0063320 A1* | 3/2015 | Merlin | H04L 47/12 370/336 |
| 2016/0128024 A1* | 5/2016 | Frederiks | H04W 72/04 370/329 |

OTHER PUBLICATIONS

IEEE, [online]; [retrieved on Jul. 16, 2015]; retrieved from the Internet https://mentor.ieee.org/802.11/dcn/15/11-15-0843-01-00ax-ul-mu-ofdma-analysis.pptx Yonggang Fang, "UL MU OFDMA analysis", IEEE, vol. 802, No. 1, 2015, pp. 1-20.
Kaiying Lv, "TA Address Field in Trigger Frame", IEEE, vol. 802, 2015, pp. 1-16.
Woojin Ahn, "Multi channel availability for UL-OFDMA", IEEE, vol. 802, No. 1, 2015, pp. 1-16.

\* cited by examiner

send a radio frame to multiple stations, to trigger the stations to perform uplink multi-user transmission, wherein when the stations belong to different basic service sets BSSs of the access point, the sending address of the radio frame is set as a common address — 301

DATA TRANSMISSION METHOD, ACCESS POINT AND STATION

CROSS-REFERENCE TO RELATED APPLICATION

This application is based upon and claims priority to PCT Application No. PCT/CN2016/097233, filed on Aug. 29, 2016, which is based upon and claims priority to Chinese Patent Application No. 201510545945.6, filed on Aug. 31, 2015 and Chinese Patent Application No. 201510658707.6 filed on Oct. 12, 2015, and the entire contents thereof are incorporated herein by reference.

TECHNICAL FIELD

The present disclosure relates to wireless communication technology, and more particularly, to a data transmission method, an access point and a station in a wireless local area network.

BACKGROUND

As WLANs (Wireless Local Area Networks) continue to expand, the load of WLAN networks is also increasing. With the increase of the number of users, the efficiency of WLAN networks decreases sharply due to the dense networks. Simply increasing the transmission rate cannot solve this problem, multi-user parallel transmission as an alternative solution to network efficiency has aroused widespread concern and research.

In the related art, the multi-user parallel transmission technology includes Multi-User Multiple-Input Multiple-Output (MU-MIMO) technology, Orthogonal Frequency Division Multiple Access (OFDMA) Technology, among others. MU-MIMO utilizes space multiplexing technology to improve time and frequency utilization. The introduction of OFDMA technology enables multiple stations to be frequency-division-multiplexed over the entire bandwidth, making it possible to more efficiently utilize the result of inter-site frequency selection and improve spectrum utilization.

Figure 1:
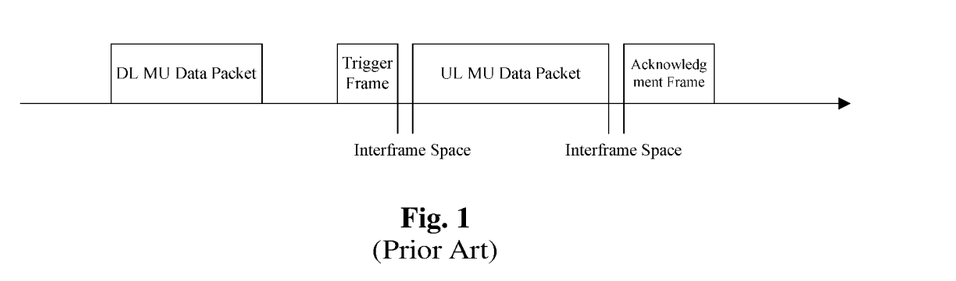
FIG. 1 is a schematic diagram illustrating frame exchange of multi-user parallel transmission.

In a WLAN, multiple non-access point stations (non-AP STAs) send data to an access point (AP) at the same time, which is generally referred to as Uplink Multi-User (UL MU) transmission (a user is taken as a station). The AP sends data to multiple non-AP STAs at the same time, which is generally referred to as Downlink Multi-User (DL MU) transmission. A typical frame exchange sequence of UL MU and DL MU transmission is shown in FIG. 1.

The UL MU transmission requires to be triggered by an AP, for example, triggered by sending an independent trigger frame, or triggered by carrying a trigger information field in a radio frame. The trigger frame or the triggering information field includes scheduling information of the station, such as identification information of the station, time and frequency resource information used by the station for uplink transmission, and the like. After the AP sends the trigger frame or the trigger information field, the station receives the trigger frame or the trigger information field, and if its own identification information is carried therein, it indicates that the station is scheduled in this UL MU transmission, and if the station has data to be transmitted, the station transmits the data on the allocated time and frequency resource. In the following, a separate trigger frame or a radio frame carrying a trigger information field will be collectively referred to as a trigger frame.

Figure 2:
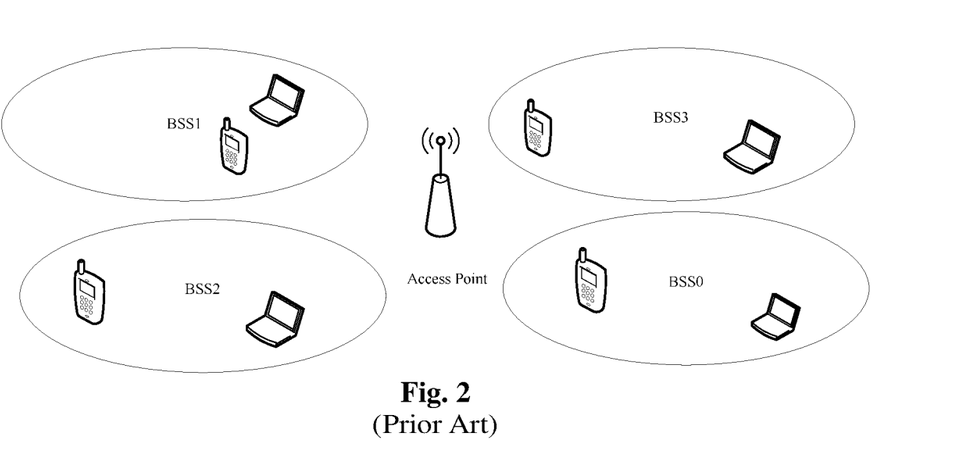
FIG. 2 is a schematic diagram illustrating multiple BSSs under an AP.

In a WLAN, one AP and multiple non-AP STAs associated with the AP form a basic service set (BSS). In general, one AP can open a BSS, and the identifier BSSID of the BS is the Media Access Control (MAC) address of the AP. For the sake of application, a WLAN allows one AP to configure multiple BSSs. As shown in FIG. 2, the multiple BSSs and the BSS of BSSID which is the MAC address of the AP, make up a BSS set of the AP. Each BSS in the set may have respective service and security policy settings. Due to the small number of channels that are not overlapped in the non-licensed frequency band in Industrial Scientific Medical (ISM), if each AP sets up BSS independently, according to the principle that a channel for an AP does not overlap with a channel for another AP as possible it could be, since there is a small number of available channels, a larger co-channel and adjacent channel interference will be generated among the Aps. When one AP is allowed to configure multiple BSSs, this means that the same channel may be used by multiple BSSs, which can reduce interference. In addition, multiple BSSs in the BSS set have respective service and security policy settings, which can meet enterprise-level network requirements. For example, a BSS security policy used by a visitor may be set as Wired Equivalent Privacy (WEP), a BSS security policy used by internal employees is set to Wi-Fi Web Security Access 2 (WPA2, Wi-Fi Protected Access 2) and so on. The multiple BSSs actually correspond to a physical AP, and the AP broadcasts a parameter set of its own BSS set in a Beacon. For each BSS in the BSS set, a BSS parameter set includes a BSSID, an SSID, capability information of the BSS and so on.

In a multi-user parallel transmission scenario, an AP may trigger an uplink multi-user transmission at any station under its own BSS set. However, in this case, how to use trigger frames for uplink multi-user transmission and how to proceed the frame exchange sequence of the uplink multi-user transmission, these are technical problems to be solved.

This section provides background information related to the present invention which is not necessarily prior art.

SUMMARY

In order to solve the above technical problems, technical solutions described herein provide a data transmission method, an access point and a station.

A data transmission method provided by an embodiment of the present disclosure is applied to an access point. The method includes:

sending a radio frame to multiple stations, to trigger the stations to perform uplink multi-user transmission, wherein when the stations belong to different basic service sets BSSs of the access point, the sending address of the radio frame is set as a common address.

In an embodiment of the present disclosure, the radio frame carries indication information, and the indication information is for indicating whether the current radio frame is a trigger frame for multiple basic service sets.

In an embodiment of the present disclosure, the indication information is carried in a physical layer signaling field of the radio frame or in a MAC layer signaling field of the radio frame.

In an embodiment of the present disclosure, the indication information carried in the MAC layer signaling field is a frame type.

In an embodiment of the present disclosure, the method further includes:

when the indication information indicates that the radio frame is a trigger frame for multiple basic service sets, setting the sending address of the radio frame as a common address.

In an embodiment of the present disclosure, the common address is a MAC address of the access point or a BSSID of any BSS in the BSS set of the access point or a value obtained through calculation from the MAC address of the access point.

In an embodiment of the present disclosure, the calculation is to intercept the upper n bits of the MAC address of the access point and set the lower m bits to 0, where m and n are integers greater than or equal to zero and the sum of n and m is 48.

In an embodiment of the present disclosure, the calculation is to reverse the value of the highest i bits of the MAC address of the access point, that is, to set 1 in the highest i bits of the MAC address of the access point to 0 and set 0 to 1, where i is an integer greater than or equal to 1.

In an embodiment of the present disclosure, the method further includes:
before the radio frame is sent, sending the value obtained by performing calculation from the MAC address of the access point or a parameter required for the calculation to the station.

In an embodiment of the present disclosure, the method further includes:
before the radio frame is sent, sending a BSS parameter set of the access point to the stations, wherein the BSS parameter set at least includes a BSSID of a BSS in the BSS set of the access point.

In an embodiment of the present disclosure, the method further includes:
when a response frame to the radio frame sent by the station is received, sending an acknowledgment frame to the station.

In an embodiment of the present disclosure, the method further includes:
when the acknowledgment frame is sent to stations under different BSSs of the access point and the acknowledgment frame is an acknowledgment frame for multiple stations with a receiving address being a broadcast address, setting the sending address of the acknowledgment frame as a common address.

In an embodiment of the present disclosure, the method further includes:
when the acknowledgment frame is sent to stations under the same BSS of the access point and the acknowledgment frame is an acknowledgment frame for multiple stations with a receiving address being a broadcast address, setting the sending address of the acknowledgment frame as the BSSID of the BSS to which the stations belong.

In an embodiment of the present disclosure, the method further includes:
when the acknowledgment frame is sent to the stations through downlink multi-user transmission, setting the sending address as the BSSID of the BSS to which the stations belong.

A data transmission method provided by another embodiment of the present disclosure is applied to a station. The method includes:
receiving a radio frame sent by an access point, the radio frame for triggering the station to perform uplink multi-user transmission; and
performing uplink multi-user transmission.

In an embodiment of the present disclosure, the method further includes:
before the radio frame is received, acquiring a BSS parameter set of the access point.

In an embodiment of the present disclosure, the method further includes:
before the radio frame is received, acquiring the value obtained by performing calculation from a media access control MAC address of the access point or a parameter required for the calculation.

In an embodiment of the present disclosure, after the radio frame sent by the access point is received, the method further includes:
determining a frame type of the radio frame, determining a receiving address of the radio frame, determining a sending address of the radio frame, and determining whether there is identification information of the station included in the radio frame.

In an embodiment of the present disclosure, when the frame type of the radio frame is a trigger frame, the sending address of the radio frame is a common address, the receiving address of the radio frame is a broadcast address, and the radio frame includes the identification information of the station, responding to the radio frame, to perform uplink multi-user transmission.

In an embodiment of the present disclosure, after the radio frame sent by the access point is received, the method further includes:
determining indication information in the radio frame, determining a receiving address of the radio frame, determining a sending address of the radio frame, and determining whether there is identification information of the station included in the radio frame;
when the indication information is carried in a physical layer signaling field of the radio frame and indicates that the radio frame is a trigger frame for multiple basic service sets, a sending address of the radio frame is a common address, a receiving address of the radio frame is a broadcast address, and the radio frame includes the identification information of the station, responding to the radio frame, to perform uplink multi-user transmission; or
when the indication information is carried in a MAC layer signaling field of the radio frame and indicates that the radio frame is a trigger frame for multiple basic service sets, a sending address of the radio frame is a common address, a receiving address of the radio frame is a broadcast address, and the radio frame includes the identification information of the station, responding to the radio frame, to perform uplink multi-user transmission.

In an embodiment of the present disclosure, the method further includes:
when uplink multi-user transmission is performed, setting the receiving address of the transmitted response frame as the BSSID of the BSS to which the station belongs.

In an embodiment of the present disclosure, the method further includes:
when the radio frame is received and the BSSID in the radio frame is a BSSID in the BSS parameter set, performing no channel reuse transmission.

An access point provided by an embodiment of the present disclosure has multiple different basic service sets BSSs, and the access point includes:
a first sending unit configured to send a radio frame to multiple stations, to trigger the stations to perform uplink multi-user transmission, wherein when the stations belong to different basic service sets of the access point, the sending address of the radio frame is set as a common address.

In an embodiment of the present disclosure, when the stations belong to different BSSs of the access point, the radio frame carries indication information, and the indication information is for indicating whether the current radio frame is a trigger frame for multiple basic service sets.

In an embodiment of the present disclosure, the indication information is carried in a physical layer signaling field of the radio frame or in a MAC layer signaling field of the radio frame.

In an embodiment of the present disclosure, the indication information carried in the MAC layer signaling field is a frame type.

In an embodiment of the present disclosure, the access point further includes:
  a first setting unit configured to, when the indication information indicates that the radio frame is a trigger frame for multiple basic service sets, set the sending address of the radio frame as a common address.

In an embodiment of the present disclosure, the common address is a MAC address of the access point or a BSSID of any BSS in the basic service set BSS set of the access point or a value obtained through calculation from the MAC address of the access point.

In an embodiment of the present disclosure, the calculation is to intercept the upper n bits of the MAC address of the access point and set the lower m bits to 0, where m and n are integers greater than or equal to zero and the sum of n and m is 48.

In an embodiment of the present disclosure, the calculation is to reverse the value of the highest i bits of the MAC address of the access point, that is, to set 1 in the highest i bits of the MAC address of the access point to 0 and set 0 to 1, where i is an integer greater than or equal to 1.

In an embodiment of the present disclosure, the access point further includes:
  a second sending unit configured to, before the radio frame is sent, send the value obtained by performing calculation from the MAC address of the access point or a parameter required for the calculation to the station.

In an embodiment of the present disclosure, the access point further includes:
  a third sending unit configured to, before the radio frame is sent, send a BSS parameter set of the access point to the stations, wherein the BSS parameter set at least includes a BSSID of a BSS in the BSS set of the access point.

In an embodiment of the present disclosure, the access point further includes:
  a receiving unit configured to receive a response frame to the radio frame sent by the station; and
  a fourth sending unit configured to, when the response frame to the radio frame sent by the station is received by the receiving unit, send an acknowledgment frame to the station.

In an embodiment of the present disclosure, the access point further includes:
  a second setting unit configured to, when the acknowledgment frame is sent to stations under different BSSs of the access point and the acknowledgment frame is an acknowledgment frame for multiple stations with a receiving address being a broadcast address, set the sending address of the acknowledgment frame as a common address.

In an embodiment of the present disclosure, the access point further includes:
  a third setting unit configured to, when the acknowledgment frame is sent to stations under the same BSS of the access point and the acknowledgment frame is an acknowledgment frame for multiple stations with a receiving address being a broadcast address, set the sending address of the acknowledgment frame as the BSSID of the BSS to which the stations belong.

In an embodiment of the present disclosure, the access point further includes:
  a fourth setting unit configured to, when the acknowledgment frame is sent to the stations through downlink multi-user transmission, set the sending address as the BSSID of the BSS to which the stations belong.

A station provided by an embodiment of the present disclosure includes:
  a receiving unit configured to receive a radio frame sent by an access point, the radio frame for triggering the station to perform uplink multi-user transmission; and
  a transmission unit configured to perform uplink multi-user transmission.

In an embodiment of the present disclosure, the station further includes:
  a first acquiring unit configured to, before the radio frame is received, acquire a BSS parameter set of the access point.

In an embodiment of the present disclosure, the station further includes:
  a second acquiring unit configured to, before the radio frame is received, acquire the value obtained by performing calculation from a media access control MAC address of the access point or a parameter required for the calculation.

In an embodiment of the present disclosure, the station further includes:
  a first determining unit configured to determine a frame type of the radio frame, determine a receiving address of the radio frame, determine a sending address of the radio frame, and determine whether there is identification information of the station included in the radio frame.

In an embodiment of the present disclosure, the station further includes:
  a first responding unit configured to, when the frame type of the radio frame is a trigger frame, the sending address of the radio frame is a common address, the receiving address of the radio frame is a broadcast address, and the radio frame includes the identification information of the station, respond to the radio frame, to perform uplink multi-user transmission.

In an embodiment of the present disclosure, the station further includes:
  a second determining unit configured to determine indication information in the radio frame, determine a receiving address of the radio frame, determine a sending address of the radio frame, and determine whether there is identification information of the station included in the radio frame;
  a second responding unit configured to, when the indication information is carried in a physical layer signaling field of the radio frame and indicates that the radio frame is a trigger frame for multiple basic service sets, a sending address of the radio frame is a common address, a receiving address of the radio frame is a broadcast address, and the radio frame includes the identification information of the station, respond to the radio frame, to perform uplink multi-user transmission; or when the indication information is carried in a MAC layer signaling field of the radio frame and indicates that the radio frame is a trigger frame for multiple basic service sets, a sending address of the radio frame is a common address, a receiving address of the radio frame is a broadcast address, and the radio frame includes the identification information of the station, respond to the radio frame, to perform uplink multi-user transmission.

In an embodiment of the present disclosure, the station further includes:

a setting unit configured to, when uplink multi-user transmission is performed, set the receiving address of the transmitted response frame as the BSSID of the BSS to which the station belongs.

In an embodiment of the present disclosure, when the radio frame is received and the BSSID in the radio frame is a BSSID in the BSS parameter set, no multiplexing transmission is performed.

In the technical solutions of the present disclosure, the access point sends the radio frame to multiple stations and triggers the stations to perform uplink multi-user transmission. When the stations belong to different basic service sets of the access point, a sending address of the radio frame is set as a common address. Thus, the access point can trigger all stations under its own multiple BSSs to perform uplink multi-user transmission. It can improve the utilization of the air interface, and reduce the bandwidth waste.

This section provides a summary of various implementations or examples of the technology described in the present invention, and is not a comprehensive disclosure of the full scope or all features of the disclosed technology.

DETAILED DESCRIPTION

In order to understand the features and technical contents of the present disclosure in detail, the implementation of one or more embodiments is described in detail below with reference to the accompanying drawings, which are provided for reference only, and are not intended to limit the technical solutions described herein.

Figure 3:
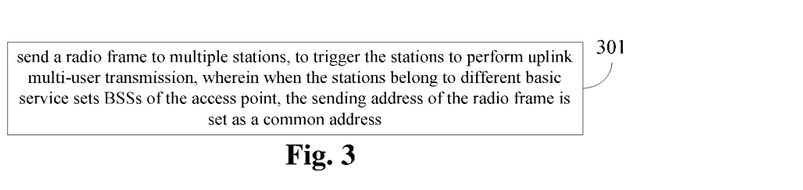
FIG. 3 is a first flow chart illustrating a data transmission method according to an embodiment of the present disclosure.

FIG. 3 is a first flow chart illustrating a data transmission method according to an embodiment of the present disclosure. As shown in FIG. 3, a data transmission method in this example is applied to an access point. The data transmission method includes the following steps.

In Step 301, a radio frame is sent to multiple stations, to trigger the stations to perform uplink multi-user transmission. When the stations belong to different basic service sets of the access point, the sending address of the radio frame is set as a common address.

In an embodiment of the present disclosure, the radio frame carries indication information, and the indication information is used to indicate whether the current radio frame is a trigger frame for multiple basic service sets.

In an embodiment of the present disclosure, the indication information is carried in a physical layer signaling field of the radio frame or in a MAC layer signaling field of the radio frame.

The indication information carried in the MAC layer signaling field is a frame type.

In an embodiment of the present disclosure, the method further includes the following step.

When the indication information indicates that the radio frame is a trigger frame for multiple basic service sets, the sending address of the radio frame is set as a common address.

The common address is a MAC address of the access point or a BSSID of any BSS in the basic service set of the access point or a value obtained through calculation from the MAC address of the access point.

In one embodiment, the calculation is to intercept the upper n bits of the MAC address of the access point and set the lower m bits to 0, where m and n are integers greater than or equal to zero and the sum of n and m is 48.

In another embodiment, the calculation is to intercept w bits at a predefined location of the MAC address of the access point and set other bits to 0, where w is a positive integer greater than zero.

In another embodiment, the calculation is to reverse the value of the highest i bits of the MAC address of the access point, that is, to set 1 in the highest i bits to 0 and set 0 to 1, where i is an integer greater than or equal to 1.

In an embodiment of the present disclosure, the method further includes the following step.

Before the radio frame is sent, the value obtained by performing calculation from the MAC address of the access point or a parameter required for the calculation is sent to the station.

In an embodiment of the present disclosure, the method further includes the following step.

Before the radio frame is sent, a BSS parameter set of the access point is sent to the stations. The BSS parameter set at least includes a BSSID of a BSS in a BSS set of the access point.

In an embodiment of the present disclosure, the method further includes the following step.

When a response frame to the radio frame sent by a station is received, an acknowledgment frame is sent to the station.

In an embodiment of the present disclosure, the method further includes the following step.

When the acknowledgment frame is sent to stations under different BSSs of the access point and the acknowledgment frame is an acknowledgment frame for multiple stations with a receiving address being a broadcast address, the sending address of the acknowledgment frame is set as a common address.

In an embodiment of the present disclosure, the method further includes the following step.

When the acknowledgment frame is sent to stations under the same BSS of the access point and the acknowledgment frame is an acknowledgment frame for multiple stations with a receiving address being a broadcast address, the sending address of the acknowledgment frame is set as the BSSID of the BSS to which the stations belong.

In an embodiment of the present disclosure, the method further includes the following step.

When the acknowledgment frame is sent to the stations through downlink multi-user transmission, the sending address is set as the BSSID of the BSS to which the stations belong.

Figure 4:
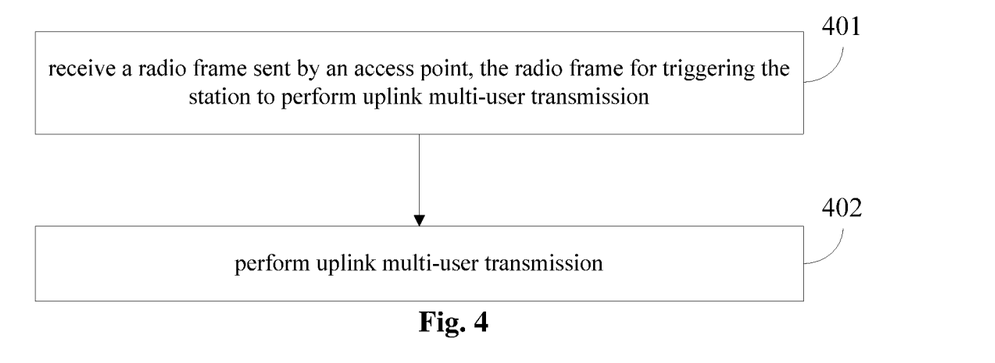
FIG. 4 is a second flow chart illustrating a data transmission method according to an embodiment of the present disclosure.

FIG. 4 is a second flow chart illustrating a data transmission method according to an embodiment of the present disclosure. The data transmission method in this example is applied to a station. As shown in FIG. 4, the data transmission method includes the following steps.

In Step 401, a radio frame sent by an access point is received. The radio frame is for triggering the station to perform uplink multi-user transmission.

In an embodiment of the present disclosure, the method further includes the following step.

Before receiving the radio frame, a BSS parameter set of the access point is acquired.

In an embodiment of the present disclosure, the method further includes the following step.

Before receiving the radio frame, the value obtained by performing calculation from a MAC address of the access point or a parameter required for the calculation is acquired.

In an embodiment of the present disclosure, after the radio frame sent by the access point is received, the method further includes the following step.

A frame type of the radio frame is determined, a receiving address of the radio frame is determined, a sending address of the radio frame is determined, and it is determined whether there is identification information of the station included in the radio frame.

When the frame type of the radio frame is a trigger frame, the sending address of the radio frame is a common address, the receiving address of the radio frame is a broadcast address, and the radio frame includes the identification information of the station, the radio frame is responded, to perform uplink multi-user transmission.

In an embodiment of the present disclosure, after receiving the radio frame sent by the access point, the method includes the following step.

Indication information in the radio frame is determined, a receiving address of the radio frame is determined, a sending address of the radio frame is determined, and it is determined whether there is identification information of the station included in the radio frame.

When the indication information is carried in a physical layer signaling field of the radio frame and indicates that the radio frame is a trigger frame for multiple basic service sets, a sending address of the radio frame is a common address, a receiving address of the radio frame is a broadcast address, and the radio frame includes the identification information of the station, the radio frame is responded, to perform uplink multi-user transmission.

Alternatively, when the indication information is carried in a MAC layer signaling field of the radio frame and indicates that the radio frame is a trigger frame for multiple basic service sets, a sending address of the radio frame is a common address, a receiving address of the radio frame is a broadcast address, and the radio frame includes the identification information of the station, the radio frame is responded, to perform uplink multi-user transmission.

In an embodiment of the present disclosure, the method includes the following step.

When performing uplink multi-user transmission, the receiving address of the transmitted response frame is set as the BSSID of the BSS to which the station belongs.

In Step 402, uplink multi-user transmission is performed.

In an embodiment of the present disclosure, when the radio frame is received and the BSSID in the radio frame is a BSSID in the BSS parameter set, no multiplexing transmission is performed.

The following describes one or more embodiments of the technical solutions described herein in further detail with reference to specific application scenarios. It should be understood that the embodiments described herein are merely used for describing and explaining the technical solutions, and are not intended to limit the technical solutions described herein. The embodiments in the present application and the features in the embodiments may be combined with each other without conflict.

First Embodiment

Figure 5:
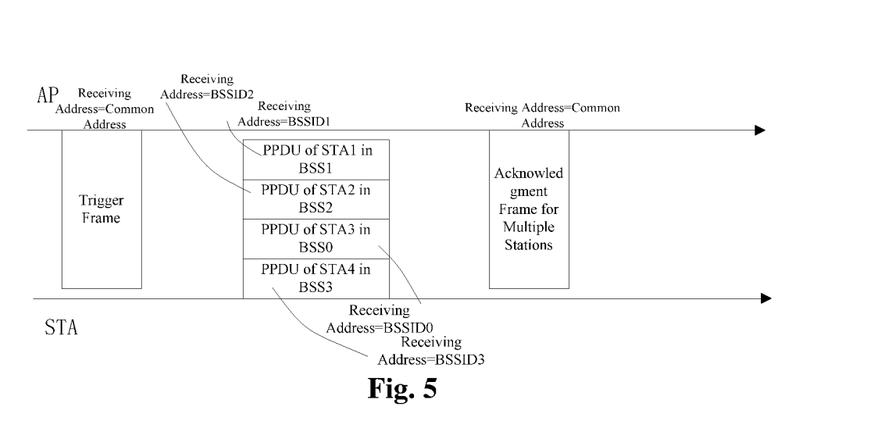
FIG. 5 is a schematic diagram illustrating address setting according to a first embodiment of the present disclosure.

Referring to FIG. 5, the AP notifies that the AP supports multiple BSSs in a Beacon and a Probe Response frame sent by the AP, and carries its own BSS parameter set in the Beacon and the Probe Response frame.

The AP supports a maximum of $2^m$ BSSs, where m is an integer greater than or equal to zero. Assuming that the value of m is 2, the AP can support a maximum of 4 BSSs. The AP creates a BSS with a BSSID being the MAC address of the AP, named BSS0. The AP additionally creates three BSSs: BSS1, BSS2, and BSS3, and configures BSSIDs and SSIDs and other parameters of capability information respectively for BSS1, BSS2, and BSS3. The AP broadcasts the BSSIDs, SSIDs, capability information and other parameters corresponding to the three configured BSSs in the Beacon and the Probe Response frame, and the AP also notifies the value of m to the station. The sending address of the Beacon and the Probe Response frame is the MAC address of the AP, that is, the BSSID of BSS0.

The AP sends a trigger frame to multiple stations to trigger the multiple stations to perform uplink multi-user transmission. The multiple stations belong to BSS1, BSS2 and BSS3, respectively. The sending address of the trigger frame is set as a common address. This common address may be the MAC address of the AP, that is, BSSID0, or one of BSSID1, BSSID2, and BSSID3, or may be a value obtained by calculation from BSSID0. For example, the MAC address of the AP is intercepted with a value m, the upper n bits are taken, and the lower m bits are set to 0, where the sum of n and m is 48.

After receiving the trigger frame, the station determines that the frame is a trigger frame, and the sending address is a common address stored locally, for example, a value in BSSID0~BSSID3 or the higher 44 bits+4 zeros in BSSID0. The receiving address is a broadcast address. The identification information of the station is contained in the frame. Then, the station responds to the trigger frame, and performs uplink multi-user transmission. When the station performs uplink transmission, the station sets the receiving address as the BSSID of the BSS to which it belongs.

The station may reuse the time period for sending data by other BSSs for transmission. However, since all the stations in BSS0~BSS4 are actually associated with the AP, when the station receives a radio frame and the sending address or the receiving address in the frame is the BSSID of the BSS in the BSS set of the AP, the station cannot perform channel reuse operation.

The AP receives uplink multi-user data, and replies with an acknowledgment frame to confirm receipt. In this embodiment, if the stations are respectively from multiple BSSs, the AP replies with an acknowledgment frame for multiple stations. The receiving address of the frame is a broadcast address. The AP sets the sending address of the acknowledgment frame as a common address. Similar to receiving the trigger frame, the station receives and determines from the acknowledgment frame to obtain confirmation information.

Second Embodiment

The AP sends a trigger frame to multiple stations to trigger multiple stations to perform uplink multi-user transmission. The multiple stations belong to BSS1, BSS2 and BSS3, respectively. The sending address of the trigger frame is set as a common address. In this embodiment, the common address reverses the value of the highest bit of the MAC address of the access point. That is, the original value of the highest bit is 0, indicating the MAC address of the access point. After the value is reversed, the value of the highest bit becomes 1, indicating that the address is a common address.

After the station receives the trigger frame and determines that the frame is a trigger frame, the highest bit of the sending address is opposite to that of BSSID0 and the other bits are the same, the station determines that this is a common address of a BSS to which the station belongs. When the receiving address is a broadcast address, and the identification information of the station is contained in the frame, the station responds to the trigger frame to perform uplink multi-user transmission. When the identification information of the station is not contained in the frame, and the trigger frame is a trigger frame for random access resource allocation, the station may contend for access on the random access resource and may send its own uplink data if the station wins in the contention. When the station performs uplink transmission, the receiving address is set as the BSSID of the BSS to which the station belongs.

Third Embodiment

The AP sends a trigger frame to multiple stations to trigger the multiple stations to perform uplink multi-user transmission. The multiple stations belong to BSS1, BSS2 and BSS3, respectively. The sending address of the trigger frame is set as a common address. In this embodiment, the common address is the MAC address of the AP, that is, BSSID0.

The trigger frame carries indication information indicating whether the current trigger frame is a trigger frame for multiple BSSs. The indication information is located in the physical layer signaling field, indicated by 1 bit or located in the MAC layer signaling field. For example, a new frame type is used to indicate whether the current trigger frame is a trigger frame for multiple BSSs.

After receiving the trigger frame, the station determines that the frame is a trigger frame for multiple BSSs; the sending address is a common address stored locally, the receiving address is a broadcast address, and the identification information of the station is included in the frame. Then, the station responds to the trigger frame and performs uplink multi-user transmission. When the station performs uplink transmission, the receiving address is set as the BSSID of the BSS to which the station belongs.

Fourth Embodiment

Figure 6:
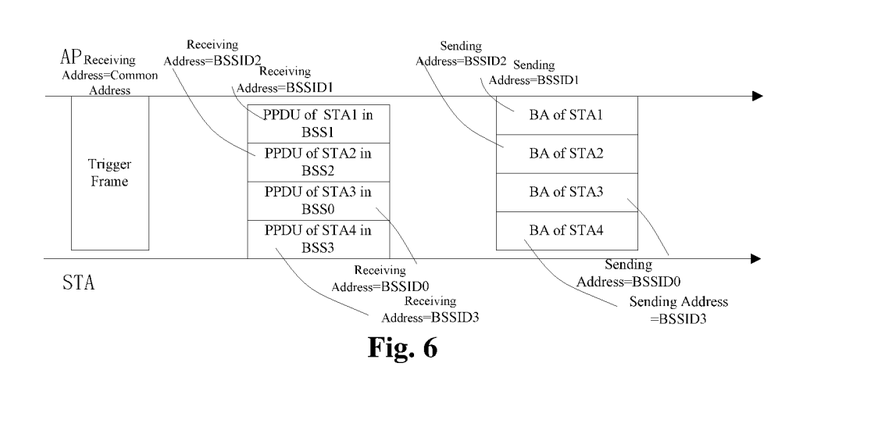
FIG. 6 is a schematic diagram illustrating address setting according to a third embodiment of the present disclosure.

Referring to FIG. 6, the AP sends a trigger frame to multiple stations (STA1, STA2, STA3, and STA4), to trigger the multiple stations to perform uplink multi-user transmission. The multiple stations belong to BSS1, BSS2, BSS0 and BSS3, respectively. The sending address of the trigger frame is set as a common address. In this embodiment, the common address is a value obtained through calculation from BSSID0. For example, the MAC address of the AP is intercepted with m=4, taking 44 higher bits and setting the lower 4 bits to 0.

The station has obtained the Beacon or the Probe Response frame sent by the AP and obtained the BSS parameter set. After receiving the trigger frame, the station determines that the frame is a trigger frame, and the sending address is a common address stored locally, for example, the higher 44 bits of BSSID0+4 zeros. The receiving address is a broadcast address, and the identification information of the station is included in the frame. Then, the station responds to the trigger frame and performs uplink multi-user transmission. When the station performs uplink transmission, the receiving address of the application protocol data unit (PPDU) packet is set as the BSSID of the BSS to which the station belongs.

The AP receives uplink multi-user data, and replies with an acknowledgment frame to confirm receipt. In this embodiment, the stations are respectively from multiple BSSs. When the AP sends the acknowledgment frame in the downlink multi-user mode, the acknowledgment frame for each station occupies one sub-channel and may be sent simultaneously. The receiving address of each acknowledgment frame (BA) is the address of each station, and the sending address is the BSSID of the BSS associated with the station.

Fifth Embodiment

Figure 7:
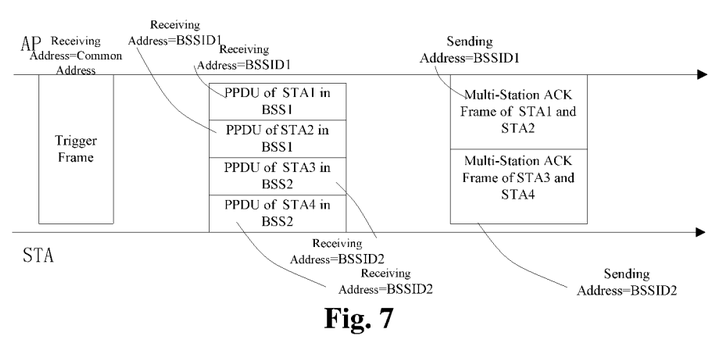
FIG. 7 is a schematic diagram illustrating address setting according to a fourth embodiment of the present disclosure.

Referring to FIG. 7, the AP sends a trigger frame to multiple stations (STA1, STA2, STA3, STA4) to trigger the multiple stations to perform uplink multi-user transmission. The multiple stations belong to BSS1 and BSS2 respectively, and the sending address of the trigger frame is set as a common address. In the present embodiment, the sending address is a value obtained through calculation from BSSID0. For example, the MAC address of the AP is intercepted with m=4, taking 44 higher bits and setting the lower 4 bits to 0.

The station has obtained the Beacon or the Probe Response frame sent by the AP and obtained the BSS parameter set. After receiving the trigger frame, the station determines that the frame is a trigger frame, and the sending address is a common address stored locally at the station, for example, the higher 44 bits of BSSID0+4 zeros. The receiving address is a broadcast address, and the identification information of the station is included in the frame. Then, the station responds to the trigger frame and performs uplink multi-user transmission. When the station performs uplink transmission, the receiving address of the application protocol data unit (PPDU) packet is set as the BSSID of the BSS to which the station belongs.

The AP receives uplink multi-user data, and replies with an acknowledgment frame to confirm receipt. In this embodiment, the stations are respectively from BSS1 and BSS2. The AP sends a multi-station acknowledgment frame to the station from BSS1, a multi-station acknowledgment frame to the station from BSS2, and the two multi-station acknowledgment frames are sent through downlink multi-user transmission, with each acknowledgment frame occupying one sub-channel. Then, the receiving address of each acknowledgment frame is the address of each station, and the sending address is the BSSID of the BSS associated with the station.

Sixth Embodiment

Figure 8:
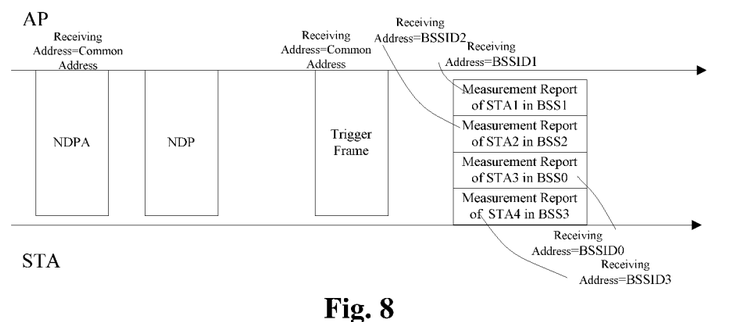
FIG. 8 is a schematic diagram illustrating address setting according to a fifth embodiment of the present disclosure.

Referring to FIG. 8, the AP sends a Null Data Packet Announcement (NDPA) frame, a NDP frame and a trigger frame to multiple stations (STA1, STA2, STA3, STA4). The NDPA frame is for triggering the multiple stations to perform channel measurement. The frame to be measured is the NPD frame sent immediately after the NDPA frame. The trigger frame is for triggering the multiple stations to perform uplink multi-user feedback, which may be a trigger frame dedicated for triggering or a Sounding Poll frame. If all the multiple stations belong to the same BSS, for example, BSS1, the sending address of the NDPA frame and the trigger frame is set as BSSID1 of BSS1. If the multiple stations belong to BSS1, BSS2 and BSS3, respectively, the sending address of the NDPA frame and the trigger frame is set as a common address. This common address can be the MAC address of the AP, that is, BSSID0, or a value obtained through calculation from BSSID0. For example, the MAC address of the AP is intercepted with m=4, taking 44 higher bits and setting the lower 4 bits to 0.

The station has obtained the Beacon or the Probe Response frame sent by the AP and obtained the BSS parameter set. After the station receives the NDPA, the station determines that the frame is a NDPA frame; the sending address is a common address stored locally at the station, for example, BSSID0, or the higher 44 bits of BSSID0+4 zeros; the receiving address is a broadcast address, and the identification information of the station is included in the frame. Then, the station performs channel measurement. After the station receives the trigger frame, the station determines that it is a trigger frame, and the sending address is the BSSID of the BSS to which the station belongs; the receiving address is the broadcast address, and the identification information of the station is included in the frame. Then, the station responds to the trigger frame and sends the channel measurement report through uplink multi-user transmission. When the station performs uplink transmission, the receiving address of the data frame carrying the measurement report is set as the BSSID of the BSS to which the station belongs.

Seventh Embodiment

Figure 9:
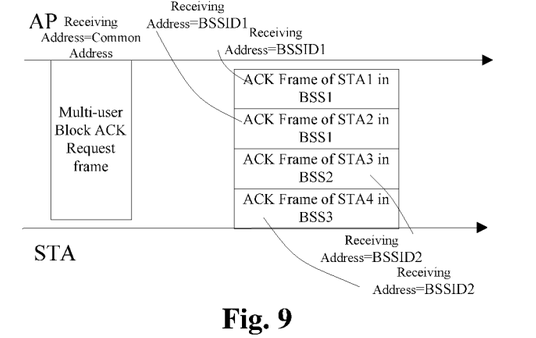
FIG. 9 is a schematic diagram illustrating address setting according to a sixth embodiment of the present disclosure.

Referring to FIG. 9, after the AP sends the downlink data, the AP sends a Multi-user Block ACK Request frame (MU-BAR), to request the station to confirm the received downlink data, and send an acknowledgment frame.

The stations belong to different BSSs (for example, BSS1, BSS2, and BSS3) in the BSS set of the AP. The AP sets the sending address of the Multi-user Block ACK Request frame to a common address. The common address may be the MAC address of the AP, that is, BSSID0. The common address may also be a value calculated from BSSID0. For example, the MAC address of the AP is intercepted with m=4, taking 44 higher bits and setting the lower 4 bits to 0.

After the station receives the Multi-user Block ACK Request frame, the station determines the type of the frame, the sending address is a pubic address stored locally at the station, for example, BSSID0 or the higher 44 bits of BSSID+4 zeros; the receiving address is a broadcast address, and the identification information of the station is included in the frame. Then, the station responds to the frame and sends an acknowledgment frame to confirm the received downlink data.

Figure 10:
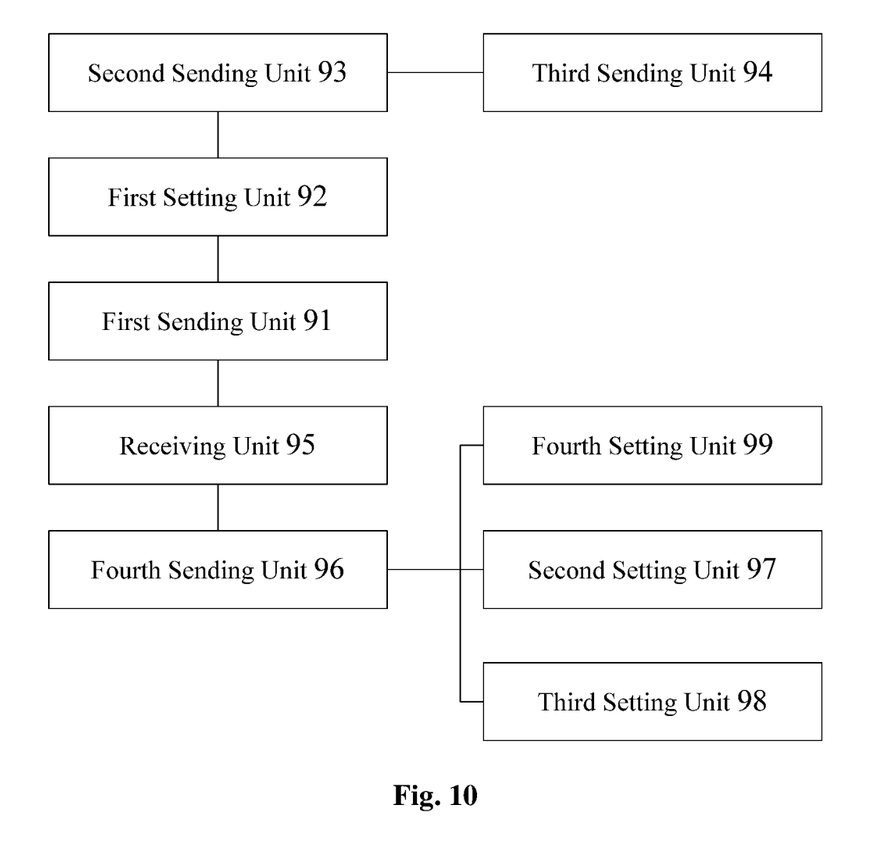
FIG. 10 is a block diagram illustrating an access point according to an embodiment of the present disclosure.

FIG. 10 is a block diagram illustrating an access point according to an embodiment of the present disclosure. The access point provided by the embodiment of the present disclosure has multiple different basic service sets. As shown in FIG. 10, the access point includes:

a first sending unit 91 configured to send a radio frame to multiple stations, to trigger the stations to perform uplink multi-user transmission. When the stations belong to different basic service sets of the access point, the sending address of the radio frame is set as a common address.

In an embodiment of the present disclosure, the radio frame carries indication information, and the indication information is used to indicate whether the current radio frame is a trigger frame for multiple basic service sets.

In an embodiment of the present disclosure, the indication information is carried in a physical layer signaling field of the radio frame or in a MAC layer signaling field of the radio frame.

In an embodiment of the present disclosure, the indication information carried in the MAC layer signaling field is a frame type.

In an embodiment of the present disclosure, the access point further includes:

a first setting unit 92 configured to, when the indication information indicates that the radio frame is a trigger frame for multiple basic service sets, set the sending address of the radio frame as a common address.

The common address is a MAC address of the access point or a BSSID of any BSS in the BSS set of the access point or a value obtained through calculation from the MAC address of the access point.

In one embodiment of the present disclosure, the calculation is to intercept the upper n bits of the MAC address of the access point and set the lower m bits to 0, where m and n are integers greater than or equal to zero and the sum of n and m is 48.

In an embodiment of the present disclosure, the calculation is to reverse the value of the highest i bits of the MAC address of the access point, where i is an integer greater than or equal to 1.

In an embodiment of the present disclosure, the access point further includes:

a second sending unit 93 configured to, before the radio frame is sent, send the value obtained by performing calculation from the MAC address of the access point or a parameter required for the calculation to the station.

In an embodiment of the present disclosure, the access point further includes:

a third sending unit 94 configured to, before the radio frame is sent, send a BSS parameter set of the access point to the stations. The BSS parameter set at least includes a BSSID of a BSS in a BSS set of the access point.

In an embodiment of the present disclosure, the access point further includes:

a receiving unit 95 configured to receive a response frame to the radio frame sent by the station; and a fourth sending unit 96 configured to, when the response frame to the radio frame sent by a station is received by the receiving unit 95, send an acknowledgment frame to the station.

In an embodiment of the present disclosure, the access point further includes:

a second setting unit 97 configured to, when the acknowledgment frame is sent to stations under different BSSs of the access point and the acknowledgment frame is an acknowledgment frame for multiple stations with a receiving address being a broadcast address, set the sending address of the acknowledgment frame as a common address.

In an embodiment of the present disclosure, the access point further includes:

a third setting unit 98 configured to, when the acknowledgment frame is sent to stations under the same BSS of the access point and the acknowledgment frame is an acknowledgment frame for multiple stations with a receiving address being a broadcast address, set the sending address of the acknowledgment frame as the BSSID of the BSS to which the stations belong.

In an embodiment of the present disclosure, the access point further includes:

a fourth setting unit 99 configured to, when the acknowledgment frame is sent to the stations through downlink multi-user transmission, set the sending address as the BSSID of the BSS to which the stations belong.

Those skilled in the art should understand that, the implementation functions of the units in the access point shown in FIG. 10 may be understood with reference to the related description of the foregoing data transmission method. The functions of each unit in the access point shown in FIG. 10 may be implemented by a program running on a processor, or may be implemented by specific logic circuits.

Figure 11:
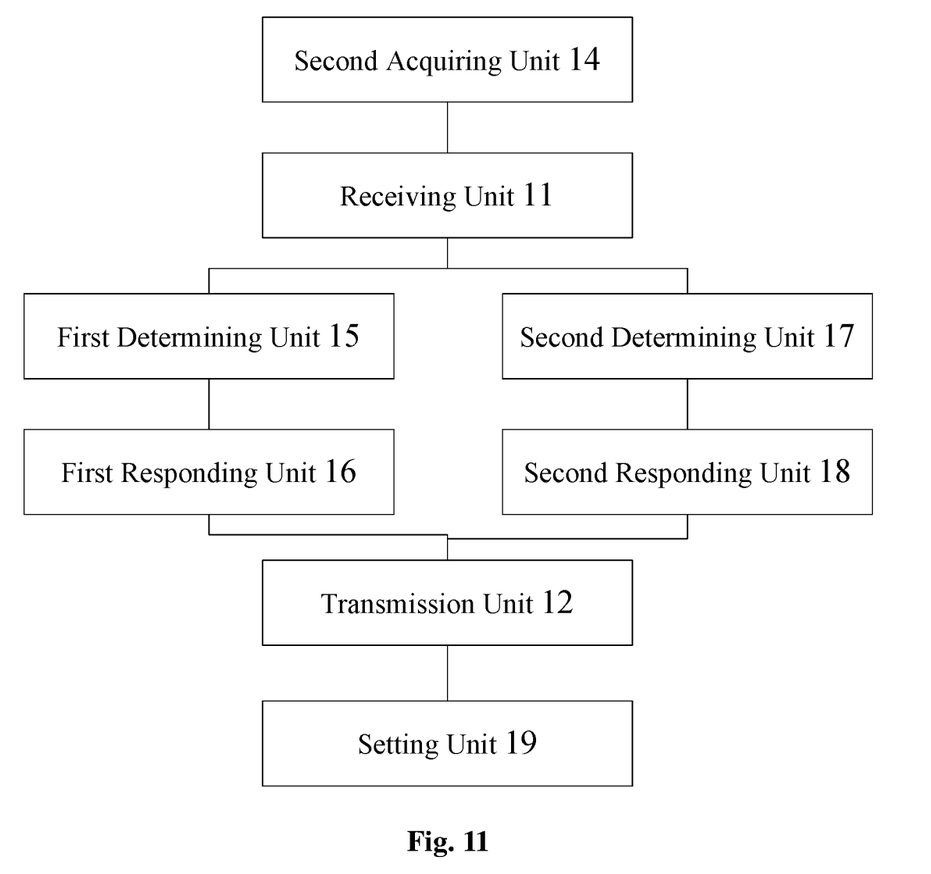
FIG. 11 is a block diagram illustrating a station according to an embodiment of the present disclosure.

FIG. 11 is a block diagram illustrating a station according to an embodiment of the present disclosure. As shown in FIG. 11, the station includes:

a receiving unit 11 configured to receive a radio frame sent by an access point, the radio frame for triggering the station to perform uplink multi-user transmission; and a transmission unit 12 configured to perform uplink multi-user transmission.

In an embodiment of the present disclosure, the station further includes:

a first acquiring unit 13 configured to, before the radio frame is received, acquire a BSS parameter set of the access point.

In an embodiment of the present disclosure, the station further includes:

a second acquiring unit 14 configured to, before the radio frame is received, acquire the value obtained by performing calculation from a MAC address of the access point or a parameter required for the calculation.

In an embodiment of the present disclosure, the station further includes:

a first determining unit 15 configured to determine a frame type of the radio frame, determine a receiving address of the radio frame, determine a sending address of the radio frame, and determine whether there is identification information of the station included in the radio frame;

a first responding unit 16 configured to, when the frame type of the radio frame is a trigger frame, the sending address of the radio frame is a common address, the receiving address of the radio frame is a broadcast address, and the radio frame includes the identification information of the station, respond to the radio frame, to perform uplink multi-user transmission.

In an embodiment of the present disclosure, the station further includes:

a second determining unit 17 configured to determine indication information in the radio frame, determine a receiving address of the radio frame, determine a sending address of the radio frame, and determine whether there is identification information of the station included in the radio frame.

In an embodiment of the present disclosure, the station further includes:

a second responding unit 18 configured to, when the indication information is carried in a physical layer signaling field of the radio frame and indicates that the radio frame is a trigger frame for multiple basic service sets, a sending address of the radio frame is a common address, a receiving address of the radio frame is a broadcast address, and the radio frame includes the identification information of the station, respond to the radio frame, to perform uplink multi-user transmission; or when the indication information is carried in a MAC layer signaling field of the radio frame and indicates that the radio frame is a trigger frame for multiple basic service sets, a sending address of the radio frame is a common address, a receiving address of the radio frame is a broadcast address, and the radio frame includes the identification information of the station, respond to the radio frame, to perform uplink multi-user transmission.

In an embodiment of the present disclosure, the station includes:

a setting unit 19 configured to, when uplink multi-user transmission is performed, set the receiving address of the transmitted response frame as the BSSID of the BSS to which the station belongs.

In an embodiment of the present disclosure, when the radio frame is received and the BSSID in the radio frame is a BSSID in the BSS parameter set, no multiplexing transmission is performed.

Those skilled in the art should understand that the implementation functions of each unit in the station shown in FIG. 11 may be understood with reference to the related description of the foregoing data transmission method. The functions of the units in the station shown in FIG. 11 may be implemented by a program running on a processor or by a specific logic circuit.

The features the embodiments of the technical solutions described herein may be combined arbitrarily without conflict.

In the several embodiments provided by the present disclosure, it should be understood that the disclosed methods and smart devices may be implemented in other manners. The device embodiments described above are merely exemplary. For example, the unit division is merely logical function division and may be other division in actual implementation. For example, multiple units or components may be combined or may be integrated into another system, or some features can be ignored or not executed. Additionally, the various components illustrated or discussed in connection with each other, or directly coupled, or communicatively coupled, may be indirectly coupled or communicatively coupled through some interfaces, devices or units, be electrically, mechanically or otherwise.

The units described above as separate components may or may not be physically separated. Components displayed as units may or may not be physical units, may be located in one place or may be distributed to multiple network units. Some or all of the units may be selected according to actual needs to achieve the objectives of the solutions in this embodiment.

In addition, the functional units in the embodiments of the technical solutions described herein may all be integrated in one second processing unit, or each unit may be used as a single unit, or two or more units may be integrated into one unit. The above-mentioned integrated unit can be implemented in the form of hardware or in the form of hardware in combination with software functional unit.

The foregoing descriptions are merely specific embodiments of the technical solutions described herein, but the protection scope of the present disclosure is not limited thereto. Anyone skilled in the art may easily conceive changes and substitutions within the technical scope disclosed in the present disclosure, and they should be covered by the protection scope of the present disclosure.

INDUSTRIAL APPLICABILITY

As described above, the data transmission method, the access point and the station provided herein have at least the following beneficial effects. The access point sends the radio frame to multiple stations and triggers the stations to perform uplink multi-user transmission. When the stations belong to different basic service sets of the access point, a sending address of the radio frame is set as a common address. Thus, the access point can trigger all stations under its own multiple BSSs to perform uplink multi-user transmission. It can improve the utilization of the air interface, and reduce the bandwidth waste.

What is claimed is:

1. A data transmission method, applied to an access point, and the method comprising:
   sending a radio frame to multiple stations, to trigger the stations to perform uplink multi-user transmission, wherein when the stations belong to different basic service sets (BSSs) of the access point, a sending address of the radio frame is set as a common address, wherein the common address is a MAC address of the access point or a BSSID of any BSS in the BSS set of the access point or a value obtained through a calculation from the MAC address of the access point;
   wherein before the radio frame is sent, the method further comprises: sending to the stations the value obtained through the calculation from the MAC address of the access point or a parameter required for the calculation, wherein the calculation comprises one of:
      intercepting the upper n bits of the MAC address of the access point and setting the lower m bits to 0, wherein m and n are integers greater than or equal to zero, and the sum of n and m is 48, or
      reversing the value of the highest i bits of the MAC address of the access point, where i is an integer greater than or equal to 1.

2. The data transmission method according to claim 1, further comprising:
   before the radio frame is sent, sending a BSS parameter set of the access point to the stations, wherein the BSS parameter set comprises at least a BSSID of a BSS in the BSS set of the access point.

3. The data transmission method according to claim 1, further comprising:
   when a response frame to the radio frame sent by the station is received, sending an acknowledgment frame to the station.

4. The data transmission method according to claim 3, further comprising:
   when the acknowledgment frame is sent to stations under different BSSs of the access point and the acknowledgment frame is an acknowledgment frame for multiple stations with a receiving address being a broadcast address, setting the sending address of the acknowledgment frame as a common address.

5. The data transmission method according to claim 3, further comprising:
   when the acknowledgment frame is sent to stations under the same BSS of the access point and the acknowledgment frame is an acknowledgment frame for multiple stations with a receiving address being a broadcast address, setting the sending address of the acknowledgment frame as the BSSID of the BSS to which the stations belong.

6. The data transmission method according to claim 3, further comprising:
   when the acknowledgment frame is sent to the stations through downlink multi-user transmission, setting the sending address of the acknowledgment frame as the BSSID of the BSS to which the stations belong.

7. A data transmission method, applied to a station, and the method comprising:
   receiving a radio frame sent by an access point, the radio frame for triggering the station to perform uplink multi-user transmission; and setting a receiving address of a response frame as a BSSID of a BSS to which the station belongs and performing uplink multi-user transmission.

8. The data transmission method according to claim 7, further comprising:
   before the radio frame is received, acquiring a value obtained by performing calculation from a media access control (MAC) address of the access point or a parameter required for the calculation.

9. The data transmission method according to claim 7, wherein a frame type of the radio frame is a trigger frame, a sending address of the radio frame is a common address, a receiving address of the radio frame is a broadcast address, and the radio frame includes an identification information of the station.

10. The data transmission method according to claim 7, wherein indication information is carried in a physical or MAC layer signaling field of the radio frame and indicates that the radio frame is a trigger frame for multiple basic service sets, a sending address of the radio frame is a common address, a receiving address of the radio frame is a broadcast address, and the radio frame includes the identification information of the station.

11. An access point, having multiple different basic service sets BSSs, and the access point comprising:
   a first sending unit configured to send a radio frame to multiple stations, to trigger the stations to perform uplink multi-user transmission, wherein when the stations belong to different basic service sets of the access point, a sending address of the radio frame is set as a common address, wherein the common address is a MAC address of the access point or a BSSID of any BSS in the BSS set of the access point or a value obtained through a calculation from the MAC address of the access point;

a second sending unit configured to, before the radio frame is sent, send the value obtained through the calculation from the MAC address of the access point for the MAC address of the access point or a parameter required for the calculation, wherein the calculation comprises one of:

intercepting the upper n bits of the MAC address of the access point and setting the lower m bits to 0, wherein m and n are integers greater than or equal to zero, and the sum of n and m is 48, or reversing the value of the highest i bits of the MAC address of the access point, where i is an integer greater than or equal to 1.

12. The access point according to claim 11, further comprising:

a receiving unit configured to receive a response frame to the radio frame sent by the station; and a fourth sending unit configured to, when the response frame to the radio frame sent by the station is received by the receiving unit, send an acknowledgment frame to the station.

13. The access point according to claim 12, further comprising:

a second setting unit configured to, when the acknowledgment frame is sent to stations under different BSSs of the access point and the acknowledgment frame is an acknowledgment frame for multiple stations with a receiving address being a broadcast address, set the sending address of the acknowledgment frame as a common address.

14. The access point according to claim 12, further comprising:

a third setting unit configured to, when the acknowledgment frame is sent to stations under the same BSS of the access point and the acknowledgment frame is an acknowledgment frame for multiple stations with a receiving address being a broadcast address, set the sending address of the acknowledgment frame as the BSSID of the BSS to which the stations belong.

15. The access point according to claim 12, further comprising:

a fourth setting unit configured to, when the acknowledgment frame is sent to the stations through downlink multi-user transmission, set the sending address of the acknowledgment frame as the BSSID of the BSS to which the stations belong.

16. A station, comprising:

a receiving unit configured to receive a radio frame sent by an access point, the radio frame for triggering the station to perform uplink multi-user transmission;

a setting unit configured to set a receiving address of a transmitted response frame as the BSSID of the BSS to which the station belongs; and a transmission unit configured to perform uplink multi-user transmission.

17. The station according to claim 16, further comprising:

a second acquiring unit configured to, before the radio frame is received, acquire a value obtained by performing calculation from a media access control (MAC) address of the access point or a parameter required for the calculation.

* * * * *